United States Patent
Wang (10) Patent No.: US 11,632,174 B2
(45) Date of Patent: Apr. 18, 2023

(54) DISPERSION COMPENSATION CIRCUIT WITH CASCADED VARACTOR CIRCUIT ELEMENTS

(71) Applicant: ARRIS Enterprises LLC, Suwanee, GA (US)

(72) Inventor: Jun Wang, Warrington, PA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 17/202,147

(22) Filed: Mar. 15, 2021

(65) Prior Publication Data
US 2021/0288718 A1    Sep. 16, 2021

Related U.S. Application Data

(60) Provisional application No. 62/989,197, filed on Mar. 13, 2020.

(51) Int. Cl.
*H04B 10/2525* (2013.01)
*H04B 10/50* (2013.01)

(52) U.S. Cl.
CPC ....... *H04B 10/2525* (2013.01); *H04B 10/503* (2013.01)

(58) Field of Classification Search
None
See application file for complete search history.

(56) References Cited

U.S. PATENT DOCUMENTS

| | | | |
|---|---|---|---|
| 5,378,937 A | 1/1995 | Heidemann et al. | |
| 7,437,082 B1* | 10/2008 | Smith | H04L 63/04 398/154 |
| 2005/0135817 A1* | 6/2005 | Harms | H04B 10/6933 398/202 |
| 2007/0264027 A1* | 11/2007 | Zhou | H04B 10/25137 398/183 |
| 2009/0245309 A1* | 10/2009 | Khalouf | H04B 10/6972 372/38.02 |
| 2013/0302039 A1* | 11/2013 | Wang | H04B 10/25137 398/192 |
| 2016/0028490 A1* | 1/2016 | Wang | H04B 10/58 398/193 |

FOREIGN PATENT DOCUMENTS

WO    2009123869 A2    10/2009

OTHER PUBLICATIONS

International Search Report and Written Opinion Re: Application No. PCT/US2021/022422 (dated Jun. 25, 2021).

* cited by examiner

*Primary Examiner* — Darren E Wolf
(74) *Attorney, Agent, or Firm* — Chernoff, Vilhauer, McClung & Stenzel, LLP (57) ABSTRACT

Systems and methods for providing dispersion compensation to optical systems. In some embodiments, the disclosed dispersion compensation system may be capable of adjusting the amount of dispersion compensation. The disclosed dispersion compensation system may include a cascade of varactor circuit elements, each with separate bias control, and optionally may include one or more switches to enable or disable selective ones of the cascaded varactor circuit elements.

20 Claims, 6 Drawing Sheets

DISPERSION COMPENSATION CIRCUIT WITH CASCADED VARACTOR CIRCUIT ELEMENTS

CROSS REFERENCE TO RELATED APPLICATIONS

This application claims benefit of U.S. Provisional Patent Application No. 62/989,197, entitled "IMPROVED DISPERSION COMPENSATION CIRCUIT WITH CASCADED VARACTOR CIRCUIT ELEMENTS," by Jun Wang filed Mar. 13, 2020, which application is hereby incorporated by reference herein.

BACKGROUND

The subject matter of this application relates to systems and methods that provide optical signals over a cable transmission network.

Early CATV systems were configured to deliver content along a coaxial transmission path from a content provider to its subscribers. As these systems evolved to not only provide a greater amount of content, but to provide data services that travel to and from the subscriber (e.g. Internet service), much of the coaxial path from the provider to the subscribers was replaced with fiber-optic cable, which could transmit a signal over a greater distance with less intermediate amplification. Initially, 1310 nm fiber-optics were deployed, but as CATV systems continue to evolve, much of the 1310 nm infrastructure is being upgraded with 1550 nm fiber optic infrastructure, as the 1550 nm wavelength experiences less attenuation loss along the length of the cable, and allows the use of wavelength division multiplexing (WDM) to simultaneously transmit both analog and digital signals.

Due to the combination of laser chirp with fiber dispersion, a directly modulated laser operated in the 1550 nm wavelength produces a great deal of distortion in the CATV transmission system. Therefore, indirectly modulated lasers have been used to emit 1550 nm light onto a fiber-optic cable or upon other fiber-optic components. Generally speaking, there are two known approaches to dispersion compensation, one being optical dispersion compensation and the other being electronic dispersion compensation. Optical dispersion technologies are expensive, prone to optical losses, and can often incur some undesired signal degradations, such as filter band limitation and optical non-linearities. Electronic dispersion compensation technologies, on the other hand is less expensive relative to optical dispersion compensation technologies, but has disadvantages such as its limitation in dispersion compensation, which limits the number of analog channels to be transmitted and transmission distance. Therefore, improvement in the dispersion compensation capability is needed.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

As previously noted, demand for bandwidth in hybrid-fiber coaxial (HFC) CATV networks is continually growing to support applications such as IP data, high definition TV and video on demand. To meet this demand, HFC networks are being upgraded to provide 1550 nm transmission and wavelength division multiplexing (WDM) rather than providing more cable, since the latter is cost-prohibitive. Also, as noted above, modulating a laser to transmit signals at that wavelength is typically accomplished using indirect or external modulation methods. Two typical types of external modulators are Mach-Zehnder modulators and electro-absorption modulators (EAMs). A Mach-Zehnder modulator receives an incoming optical signal and splits it equally, sending the split signals down two respectively different optical paths. After a certain distance, the two paths recombine, causing the optical waves to interfere with each other. Such an arrangement is known as an interferometer. The phase shift between the two optical signals is controlled by changing the delay through one or both of the optical paths by means of the electro-optic effect. If the phase shift between the two waves is 0° then the interference is constructive and the light intensity at the output is high (on state); if the phase shift is 180° then the interference is destructive and the light intensity is zero (off state). Mach-Zehnder modulation, however, is typically expensive.

An EAM consists of an active semiconductor region sandwiched in between a p- and n-doped layer, forming a p-n junction. The EAM works on the principle known as Franz-Keldysh effect, according to which the effective bandgap of a semiconductor decreases with increasing electric field. Without bias voltage across the p-n junction, the bandgap of the active region is just wide enough to be transparent at the wavelength of the laser light. However, when a sufficiently large reverse bias is applied across the p-n junction, the effective bandgap is reduced to the point where the active region begins to absorb the laser light and thus becomes opaque. Thus, an EAM may be effectively used to selectively pass or absorb light emitted by a laser depending on the voltage applied across the p-n junction of the EAM Because the electric field in the active region not only modulates the absorption characteristics, but also the refractive index, the EAM produces some chirp. However, this chirp usually is much less than that of a directly-modulated laser. Moreover, because an EAM is small, it can be integrated on the same chip as the laser itself, leading to substantial economies of production and low coupling losses between the laser and the EAM. The combination of a laser with an EAM is typically referred to as an Electro-Absorption Modulated Laser (EML).

Though EMLs offer easy integration, low driving voltage and power dissipation, the modulator inherently introduces nonlinear distortions (second order and higher) in the modulated optical signal which results in bit error rate (BER) performance degradation. These distortions vary strongly as a function of the bias point of the EAM, and therefore the precise point where distortions are minimized is set differently for different lasers. Though some pre-distortion techniques can be used to further correct for residual EAM distortion that occurs even after selection of an optimal bias point, such approaches may further add to cost due to the difficulty in precisely setting the bias to an optimal point and holding the bias to that point. Furthermore, while less expensive than Mach-Zehnder modulators, EMLs are still more expensive than a Distributed Feedback (DFB) modulated laser.

A DFB-based directly modulated transmitter is known to be one of the cheapest technologies to modulate light, but as indicated previously, directly modulated lasers produce high levels of second order distortion in the fiber due to interaction between laser chirp and dispersion of the optical signal in the fiber. Laser chirp occurs as a laser's current is changed to provide the signal being propagated; the laser's carrier density changes and therefore results in a time-dependent phase change, where variations in optical power from a laser are accompanied by modulations in frequency. Dispersion (the spatial distortion of an optical signal traveling over a fiber-optic cable) can be either modal dispersion, chromatic dispersion, or polarization mode dispersion. Modal dispersion results from the different speeds at which light travels through different fiber modes, and can be eliminated by using single mode fiber. Chromatic dispersion refers to the different traveling time for different wavelengths in the fiber, due to the differing propagation speeds at the respective wavelengths. Though some lasers can emit light in very narrow spectral bands, no laser can emit light at a single, monochromatic wavelength due to laser chirp, hence chromatic dispersion will always occur. Polarization mode dispersion results from the difference in propagation constants of a fiber optic cable due to imperfections in its geometry. Dispersion is particularly limiting when seeking to expand CATV content delivered over a fiber optic cable using techniques such as wavelength division multiplexing (WDM).

Figure 1:
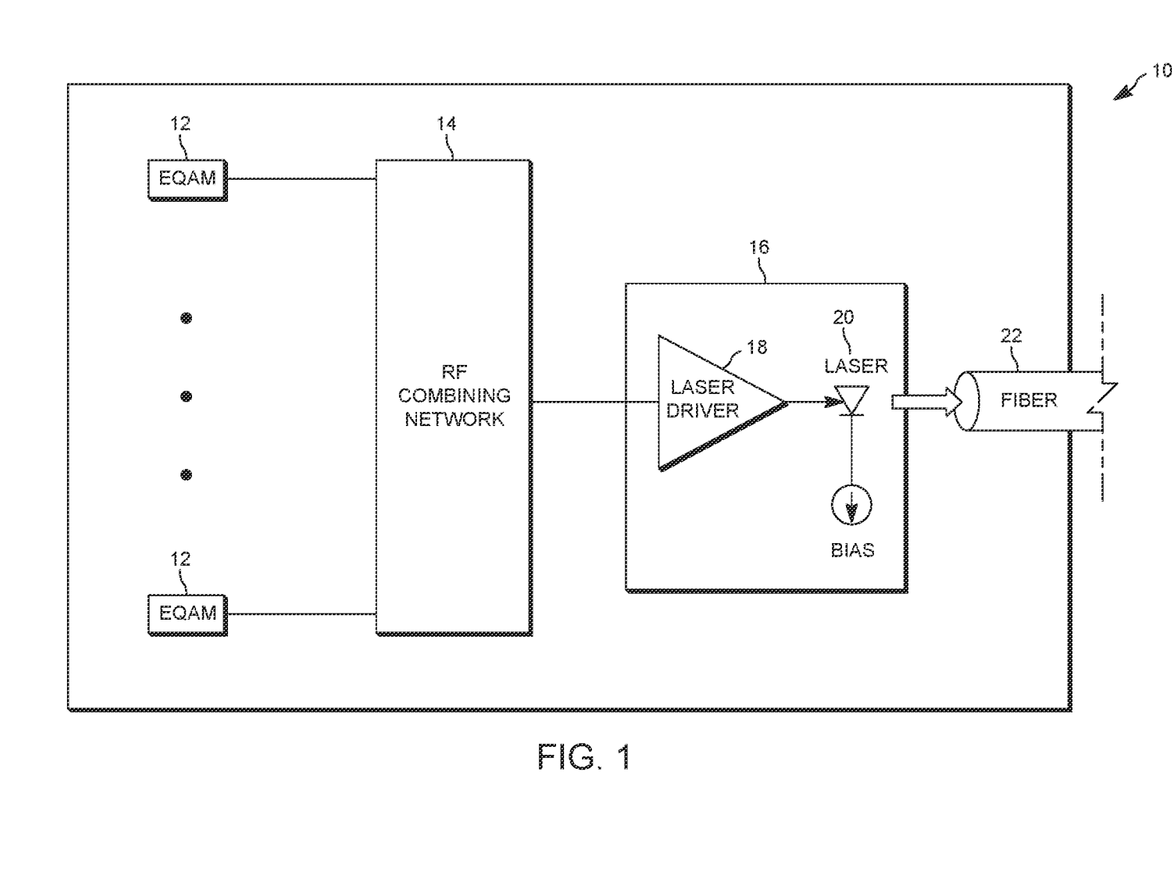
FIG. 1 shows an example of a directly modulated laser in a headend of a CATV transmission system.

FIG. 1 generally illustrates a system that uses a directly modulated laser configured to mitigate the second order distortion caused by the combination of laser chirp with optical dispersion. FIG. 1 shows a headend 10 having a plurality of EdgeQAM (EQAM) units 12 that receive signals representing content provided by a CATV operator, e.g. a plurality of cable channels, and modulate those channels using quadrature-amplitude modulation. The signals from the EQAM units 12 may preferably be combined (multiplexed) in an RF combining network 14, which delivers the signal to a transmitter 16 comprising a directly modulated laser. The transmitter 16 may include a laser driver 18 that drives a laser 20. The laser 20 then propagates the modulated signal onto a fiber optic cable 22. The laser driver 18 is preferably capable of driving lasers 20 of any appropriate wavelength, e.g. 1310 nm, 1550 nm, etc. It should also be understood that the EQAM architecture depicted is illustrative only, as substitute architectures (e.g., Converged Cable Access Platform architectures) may be readily used.

Those of ordinary skill in the art will appreciate that the system 10 is used to generally illustrate but one functional use of the disclosed directly modulated laser, and that other uses can easily be envisioned. For example, the disclosed directly modulated laser may be used in a node that transmits return path signals to a headend. More broadly, the disclosed directly modulated laser may be used in any application that transmits a modulated optical signal onto a fiber optic cable that traverses great distances for which dispersion would ordinarily be a problem. Those of ordinary skill in the art will also realize that the laser 20 includes the requisite pumps, mirrors, etc. in addition to the laser diode depicted, and may also include filtering components, such as resistors, capacitors, or inductors between the laser driver and the laser diode shown in FIG. 1

Figure 2A:
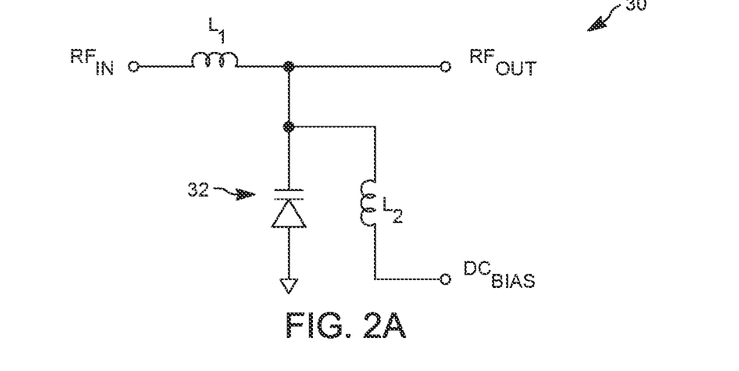
FIG. 2A shows one embodiment of a dispersion compensation circuit including a varactor.

The laser driver 18, which includes a dispersion correction circuit, preferably modulates the laser 20. FIG. 2A, for example, illustrates a dispersion compensation circuit 30 having a varactor component comprising a varactor 32 and an inductor L2 used to provide DC bias for the varactor 32. In the circuit 30, the inductor L1 and the varactor element make a low pass filter. The RF input signal changes the capacitance of the varactor diode and therefore the delay time of the low pass filter circuit. The changing delay time provides the dispersion compensation. The time delay of this LC low pass filter is given by $$T_{gd} = (LC(v))^{1/2}. \qquad (1)$$

Figure 2B:
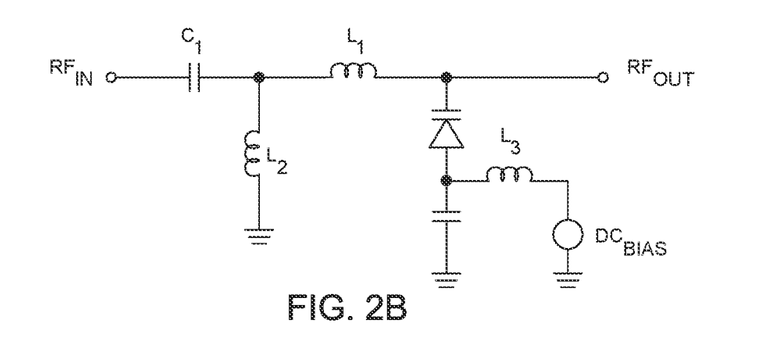
FIG. 2B shows a second embodiment of a dispersion compensation circuit including a varactor.
Figure 2C:
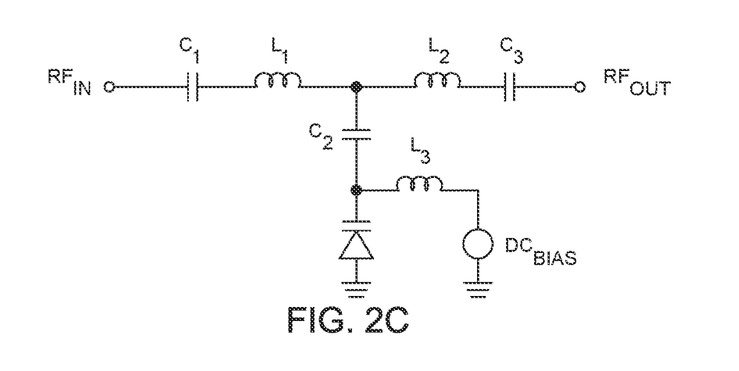
FIG. 2C shows a third embodiment of a dispersion compensation circuit including a varactor.

Although FIG. 2A shows one type of dispersion compensation circuit, many other types are known to those of skill in the art. For example, FIGS. 2B and 2C illustrate two of many alternate types of dispersion compensation circuits.

The composite second order distortion (CSO) caused by the interaction of laser chirp and fiber dispersion due to modulation can be expressed as $$CSO = N_{cso} * (w_1 + w_2)^2 I_0^2 * (\lambda^2/c)^2 (DL(dv/dI))^2 \qquad (2)$$

Where $N_{CSO}$ is the number of beats, $w_1$ and $w_2$ are two modulation carrier frequencies, $I_0$ is the modulation signal amplitude, $\lambda$ is the light wavelength, c is the speed of light, D is the fiber dispersion, L is the fiber length, and dv/dI is the laser chirp.

As seen from the equation (2), CSO is proportional to $(dv/dI)^2$ and therefore lasers of different chirp levels require different levels of dispersion compensation. Likewise, CSO is proportional to $L^2$ and thus different fiber lengths require different levels of dispersion compensation. Laser chirp and fiber length play a similar role in CSO generation.

For DFB lasers, chirp can range widely, even where the design of separate lasers is the same. For example, among the same laser batch, the high chirp value can be twice as large as the low chirp value. This is because of process control accuracy, tolerance and imperfection.

In general, tuning of dispersion compensation is accomplished by changing the varactor bias voltage to operate the varactor at a desired C-V slope. Specifically, a smaller amount of dispersion compensation requires a smaller C-V slope, while, a larger amount of dispersion compensation requires a large C-V slope. Large laser chirp distribution and large range of fiber length require a wide dispersion compensation tuning. However, from the circuit design point of view, if the tuning range is too large, the impedance variation of the dispersion compensation circuit can also vary significantly.

The capacitance of a varactor at any voltage can be expressed as $$C(v) = C_{j0}(1 + V/V_{bi})^{-\gamma} = C_{j1}(V_{bi} + V)^{-\gamma} \text{ and} \quad (3)$$

$$C_{j1} = C_{j0}(V_{bi})^{-\gamma} \quad (4)$$

where $C(v)$ is the varactor capacity at the instant voltage v, $C_{j0}$ is the varactor capacity at zero voltage, $V_{bi}$ is the built-in voltage or contact potential, and $\gamma$ is a parameter depending on the varactor doping profile. For example, $\gamma=0.5$ for an abrupt junction, and $\gamma=1.0$ for a hyper-abrupt junction.

For a fixed inductor L, a change in $C(v)$ gives rise to a change in delay time as suggested in equation (1). The RF input signal as an instant voltage changes the capacitance of the varactor diode and therefore the delay time of the low pass filter circuit. This change in delay time, or delay time delta, provides the dispersion compensation.

The chirp-dispersion caused delay may be expressed as $$\Delta \tau = -\frac{1}{C} \lambda_0^2 Dl \frac{dv}{dl} I_0 [\sin(w_1 t + \varphi_1) + \sin(w_2 t + \varphi_2)] \quad (5)$$

where D is the fiber dispersion, l is the fiber length and C is the speed of light. Equation (5) suggests that the chirp-dispersion caused delay $\Delta\tau$ is proportional to the both fiber length l and laser chirp dv/dl.

As noted earlier, the tuning of a dispersion compensation circuit is accomplished by changing the varactor bias voltage of the circuit to operate the varactor at a desired C-V slope. A smaller amount compensation requires a smaller C-V slope, while a larger amount of compensation requires a larger C-V slope. This relationship can be explained by the following equation:

$$\Delta T_{gd} = \frac{1}{2} \left( \frac{L_1}{C(v)} \right)^{1/2} \Delta C = \frac{1}{2} T_{gd} \frac{\Delta C}{C(v)} \quad (6)$$

Assuming the slope at a varactor bias is $$\frac{\delta C}{\delta v},$$

then $$\Delta C = \frac{\delta C}{\delta v} v(t) \quad (7)$$

where v(t) is the laser modulation signal voltage at the varactor. For a fixed modulation signal amplitude, $\Delta C$ is decided by $$\frac{\delta C}{\delta v}$$

or the slope of the varactor C-V curve, which is a function of varactor bias

The object of dispersion compensation is to get a modulation signal dependent delay delta as shown in equation (7) in such a way that the following relationship $$\delta T_{gd} + \Delta \tau = 0 \quad (8)$$

is satisfied when the signal is $v(t)=v_0[\sin(w_1 t+\phi_1)+\sin(w_2 t+\phi_2)]$, where $v_0$ is the signal amplitude, so that the laser chirp and the fiber-caused dispersion in equation (5) is compensated.

It can be seen from equation (6) that the signal related $\Delta T_{gd}$ is determined by both $T_{gd}$ and $$\frac{\Delta C}{C(V)}.$$

$T_{gd}$ increase with an increase of varactor capacitance, which is the function of varactor bias. On the other hand, $$\frac{\Delta C}{C(V)}$$

is also a function of varactor bias. Assuming that the instantaneous voltage applied to the varactor is expressed as $V=V_0+v(t)$, where $V_0$ is the DC bias and v(t) is the modulation signal voltage, then $\Delta C$ can be derived approximately as $$\frac{\delta C}{\delta V} v(t),$$

where $$\frac{\delta C}{\delta V}$$

is the slope of V-C curve of the varactor at the bias $V_{bi}$. From equation (3), $$\frac{\delta C}{\delta V}$$

is derived as $$\frac{\delta C}{\delta V} = -\gamma C_{j1}(V_{bi} + V)^{-(\gamma+1)} \quad (9)$$

and $$\frac{\Delta C}{C(V)} = -\gamma v(t) C_{j1}(V_{bi} + V)^{-1}. \quad (10)$$

It is seen from equation (10) that the absolute value of $$\frac{\Delta C}{C(V)}$$

becomes larger as varactor bias voltage becomes lower and $\gamma$ becomes larger.

Figure 3:
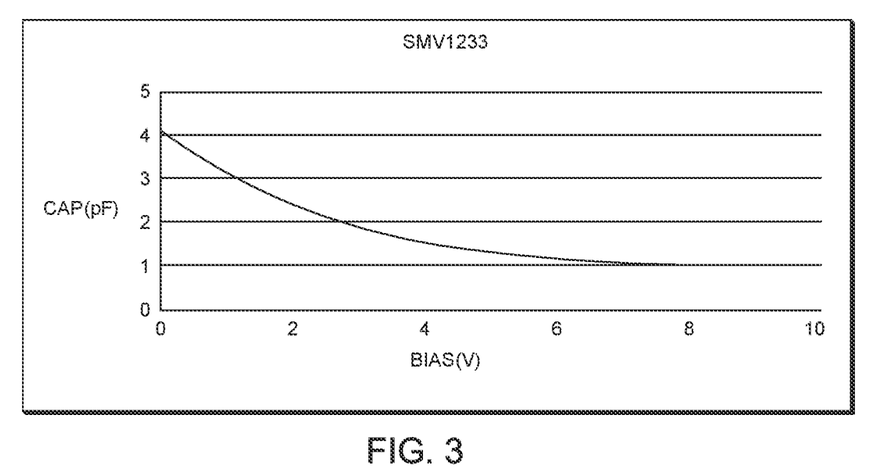
FIG. 3 shows an example varactor C-V curve.

FIG. 3 shows an example varactor C-V curve. In this example, the varactor is a Skywalks SMV1233 device.

Adjusting the varactor bias changes both the capacitance and the slope of the varactor C-V curve as exhibited in equation (3) and (9), and therefore the level of dispersion compensation.

Although adjusting the bias of the varactor can change capability of the dispersion compensation, the bias cannot be moved away significantly from its nominal value. From the circuit design point of view, the tuning range of capacitance C is limited due to two factors. The first factor is the impedance of the dispersion compensation circuit, which in the case of the circuit of FIG. 2A can be expressed as $$Z = \sqrt{\frac{L}{C}} \qquad (11)$$

where Z should be matched to the circuit characteristic impedance, $Z_0$.

The second factor is the bandwidth of the LC low pass filter, which is a function of the varactor capacitance C, and in the circuit of FIG. 2A is expressed as $$\frac{Vout}{Vin} = \frac{\frac{\sqrt{2}}{LC}}{\sqrt{\left(\frac{2}{LC} - (2\pi f)^2\right)^2 + (2\pi f)^2 \left(\frac{Z_0}{L} + \frac{1}{CZ_0}\right)^2}} \qquad (12)$$

where f is the signal frequency. 3 dB frequency $f_{3dB}$ can be derived from equation (12) by setting it equal to $$\frac{1}{\sqrt{2}}.$$

when me capacitance value of the varactor or the inductance becomes larger, the bandwidth of low pass filter becomes smaller.

Figure 4:
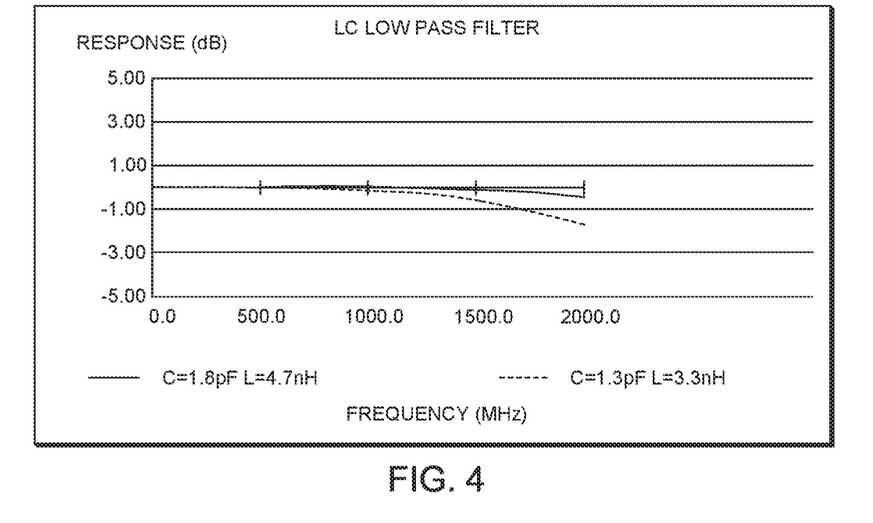
FIG. 4 shows respective responses of an exemplary 1.2 GHz dispersion compensation circuit and an exemplary 1.8 GHz dispersion compensation circuit.

FIG. 4 shows an example of two filter responses of the 50 ohm circuit as shown in FIG. 2A. One filter is targeted for 1.2 GHz bandwidth with its capacitor value of 1.8 pF and inductor value of 4.7 nH and the other filter for 1.8 GHz bandwidth with its capacitor value of 1.3 pF and inductor value of 3.3 nH. It is seen that for a larger bandwidth the allowed capacitor and inductor value become smaller which means the reduced dispersion compensation capability.

When the varactor value approaches the range of approximately 1 pF to 1.3 pF, the slope of the typical C-V curve of a varactor becomes very small, as is seen in FIG. 3, which also makes $$\frac{\Delta C}{C(v)}$$

small. It is therefore desirable to have a low varactor capacitance for extended bandwidth requirements and impedance matching on one hand, and high $$\frac{\Delta C}{C(v)}$$

for the high dispersion compensation requirement on the other hand.

The dispersion compensation capability for two filters can be calculated based on the equation (6) and compared. For example, for the two filters characterized by FIG. 4 using a Skyworks SMV1233 varactor, the signal amplitude is assumed to be 0.6V. For the 1.2 GHz filter, $\Delta T_{gd}$ is calculated to be about 6.5 ps. For the 1.8 GHz filter, $\Delta T_{gd}$ is calculated to be about 2.9 ps. The dispersion compensation capability is therefore reduced by a factor of 2.2 for the bandwidth increase of 1.5 times. This means that the maximum fiber link length will be reduced by a factor of 2.2 for the bandwidth increase of the transmitter from 1.2 GHz to 1.8 GHz.

Larger transmitter bandwidth reduces the capability of dispersion compensation circuits. It is therefore desirable to develop an improved electronic dispersion circuit that can either maintain the same dispersion compensation capability when the transmitter bandwidth is extended, or allow higher laser chirp for the same transmission link, or a longer transmission link length for the same laser chirp for the non-extended transmitter bandwidth.

Figure 5:
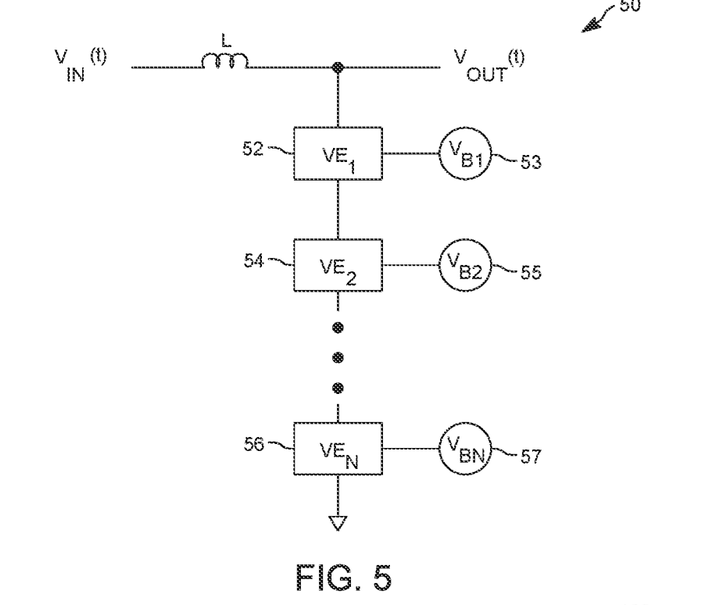
FIG. 5 schematically shows an improved dispersion compensation circuit having a plurality of cascaded varactor circuit elements.

FIG. 5 shows an example of an improved dispersion compensation circuit 50 that, rather than having a single varactor circuit element as shown in FIG. 2, has a cascade of n number of varactor circuit elements 52, 54, 56, and so forth, each provided with a separate respective bias voltage 53, 55, 57, etc. The cascade of varactor circuit elements 52, 54, and 56 are together connected to the output $V_{out}(t)$ terminal of the dispersion compensation circuit so that the inductor L and the cascaded varactor circuit elements together acts as a low pass filter for the dispersion compensation circuit 50. As explained in more detail below, the dispersion compensation circuit 50 has improved dispersion compensation characteristics so as to enable more bandwidth to be transmitted and/or allows transmission over greater fiber lengths, and/or is more tolerant of laser chirp. In a preferred embodiment, the configuration of each of the cascaded varactor circuit elements 52, 54, 56 etc. are duplicates of each other, though the circuit components within varactor circuit elements of the same configuration may have different values and types, i.e. the inductors/varactors/capacitors in each varactor circuit element may have their own unique quantitative inductance, capacitances, bias values and polarities, etc. In other embodiments, however, even these quantitative values of the internal components in the respective varactor circuit elements may duplicate each other.

Figure 6:
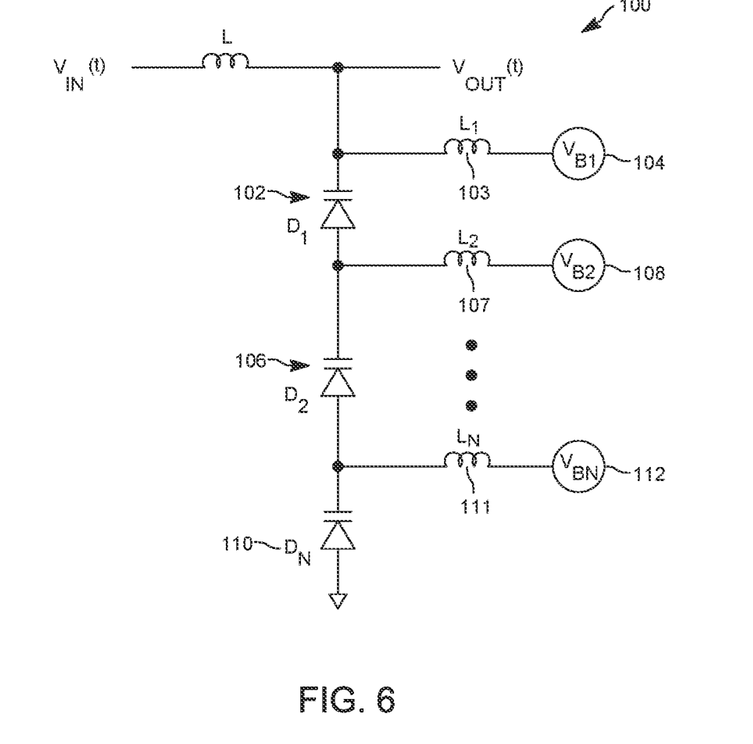
FIG. 6 shows an exemplary improved dispersion compensation circuit that uses the varactor element of FIG. 2A as each of the cascaded varactor circuit elements of FIG. 5.

An example of varactor circuit elements each having identical configurations with respect to each other is shown in FIG. 6 below, where each of the varactor circuit elements can comprise a parallel combination of a single varactor $D_1$, $D_2$, $D_n$ and a single inductor $L_1$, $L_2$, $L_n$ that is connected to a voltage source providing bias to the varactor. Alternatively, each of the varactor elements 52, 54, 56 etc. may be respective duplicates of other circuit elements, such as the varactor elements shown in FIGS. 2B and 2C, i.e. circuit elements that include a combination of one or more varactors coupled to at least one other active circuit component such as inductors and/or capacitors.

FIG. 6 shows an exemplary embodiment of an improved dispersion compensation circuit 100 where each of the cascaded varactor circuit elements comprises the varactor elements shown in FIG. 2A, i.e. a varactor in combination with an inductor that provides a bias to the varactor. Specifically, the dispersion compensation circuit may comprise a circuit inductor "L" connected at one end to a time-varying input signal $V_{in}(t)$ and connected at the other end to a time-varying output signal $V_{out}(t)$. The time-varying output signal $V_{out}(t)$ is also connected to a cascading series of varactor circuit elements, each including a respective varactor (such as varactor $D_1$ 102, $D_2$ 106 ... $D_n$ 110) along with a respective inductor (such as inductor $L_1$ 103, $L_2$ 107 ... $L_n$ 111) that is connected to the cathode of its associated varactor 102, 106 ... 110. Each of the inductors $L_1$ 103, $L_2$ 107 ... $L_n$ 111 provide respective voltage biases 104, 108, 112 to their associated varactors. The varactors 102, 106 etc. in each of the cascaded varactor circuit elements are oriented with their respective cathodes toward the output terminal of the dispersion compensation circuit 100.

Figure 7:
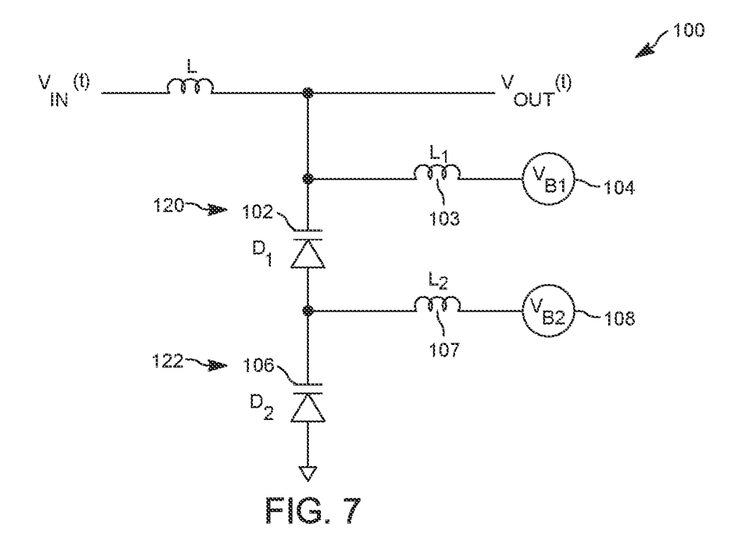
FIG. 7 shows an example of the dispersion compensation circuit of FIG. 6 having two cascaded varactor circuit elements.

To better explain why the dispersion compensation circuits of FIGS. 5 and 6 exhibit improved performance, FIG. 7 illustrates an example of the dispersion compensation circuit 100 shown in FIG. 6, limited to two cascaded varactor elements 120 and 122. The total capacitance of the two cascaded varactors can be expressed by $$C_{total} = \frac{(C_1 + \Delta C_1)(C_2 + \Delta C_2)}{C_1 + \Delta C_1 + C_2 + \Delta C_2} \cong \tag{13}$$

$$\frac{(C_1 + \Delta C_1)(C_2 + \Delta C_2)}{C_1 + C_2} \cong \frac{C_1 C_2}{C_1 + C_2} + \frac{(C_2 \Delta C_1)(C_1 \Delta C_2)}{C_1 + C_2}$$

where it is assumed that $$C = \frac{C_1 C_2}{C_1 + C_2} \tag{14}$$

and $$\Delta C = \frac{(C_2 \Delta C_1) + (C_1 \Delta C_2)}{C_1 + C_2} \tag{15}$$

and where $C_1$ and $C_2$ are the capacitance of the varactor D1 and D2, respectively. With this information, the delay time delta $\Delta T_{gd}$ based on equation (6) can be calculated by first calculating the signal swing across each varactor, again assuming again that the total signal swing is v(t):

$$v(t)_1 = v(t) \frac{c}{c_1} \tag{16}$$

and $$v(t)_2 = v(t) \frac{c}{c_2}. \tag{17}$$

Equations (16) and (17) suggest that only a portion of modulation signal is applied to each individual varactor diode, and thus the generated $\Delta C$ is nearly linearly proportional to the modulation signal, which is beneficial to the circuit's performance.

Consider the special case where D1=D2 when the bias voltage for both varactors are set to the same value, hence $C_1 = C_2$, $\Delta C_1 = \Delta C_2$ and $v(t)_1 = v(t)_2$:

$$C = \frac{C_1}{2}; \tag{18}$$

$$\Delta C = \Delta C_1; \tag{19}$$

$$v(t)_1 = v(t)_1 = \frac{v(t)}{2}; \tag{20}$$

and $$\frac{\Delta C}{C} = \frac{2\Delta C_1}{C_1} = \frac{2v(t)_1}{C_1} \frac{\delta C_1}{\delta v} = \frac{1}{C_1} \frac{\delta C_1}{\delta v} v(t) \tag{21}$$

From equation (21), $$\frac{\Delta C}{C}$$

is the same as that in the circuit of FIG. 2A when its varactor bias sets its capacitance to $C_1$, while the composite capacitance is one half of $C_1$, which is the targeted C for the extended bandwidth and impedance, as indicated by equation (11). Since $$\frac{\Delta C}{C}$$

at $C_1$ is higher than that at $$C\left(=\frac{C_1}{2}\right),$$

then the dispersion compensation capability is enhanced even at a lower combined shunt C value. Again using the Skyworks SMC1233 varactor as an example, when the varactor is biased at about 1.7V the capacitance is then 2.6 pF and $$\frac{1}{C} \frac{\delta C}{\delta v} v(t) \cong 0.16,$$

which is larger than $$\frac{1}{C} \frac{\delta C}{\delta v} v(t) \cong 0.088$$

when the varactor bias is set to 4.9V for a capacitance of 1.3 pF.

$$\frac{\Delta C}{C}$$

is therefore increased by a factor of 1.8. However, the total capacitance for the cascaded varactors still stays as 1.3 pF, which meets the required capacitor value set by the circuit bandwidth. In this case, the total dispersion compensation capability for the circuit bandwidth of 1.8 GHz is thereby increased by a factor of 1.8, which allows either a 1.8× greater laser chirp or a 1.8× longer link length.

In the above example, the delay time value $\Delta T_{gd}$ is increased by cascading two diodes of the same type. The value of $\Delta T_{gd}$ can also be increased by circuit design variations, such as different bias voltage at each varactor in the varactor cascade, different varactors in the respective cascades of varactor elements, or more cascaded varactors.

Figure 8:
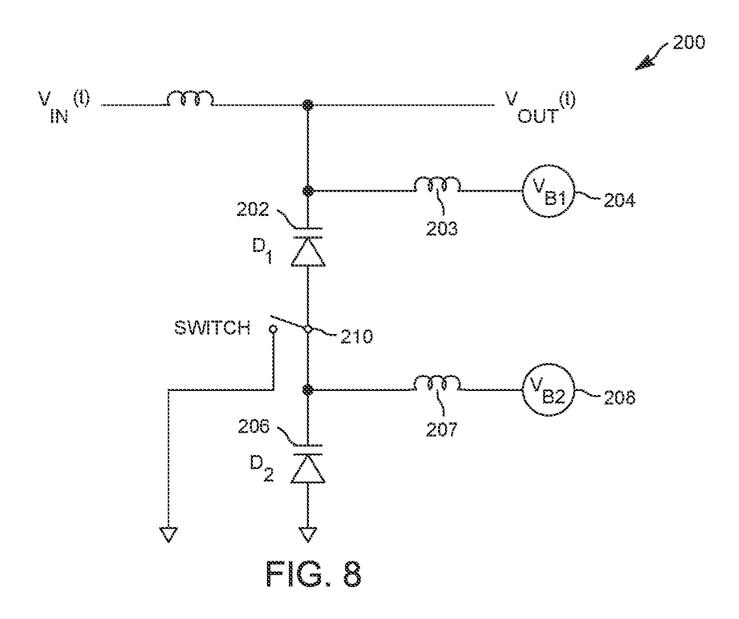
FIG. 8 shows a dispersion compensation circuit including a switch.
Figure 9:
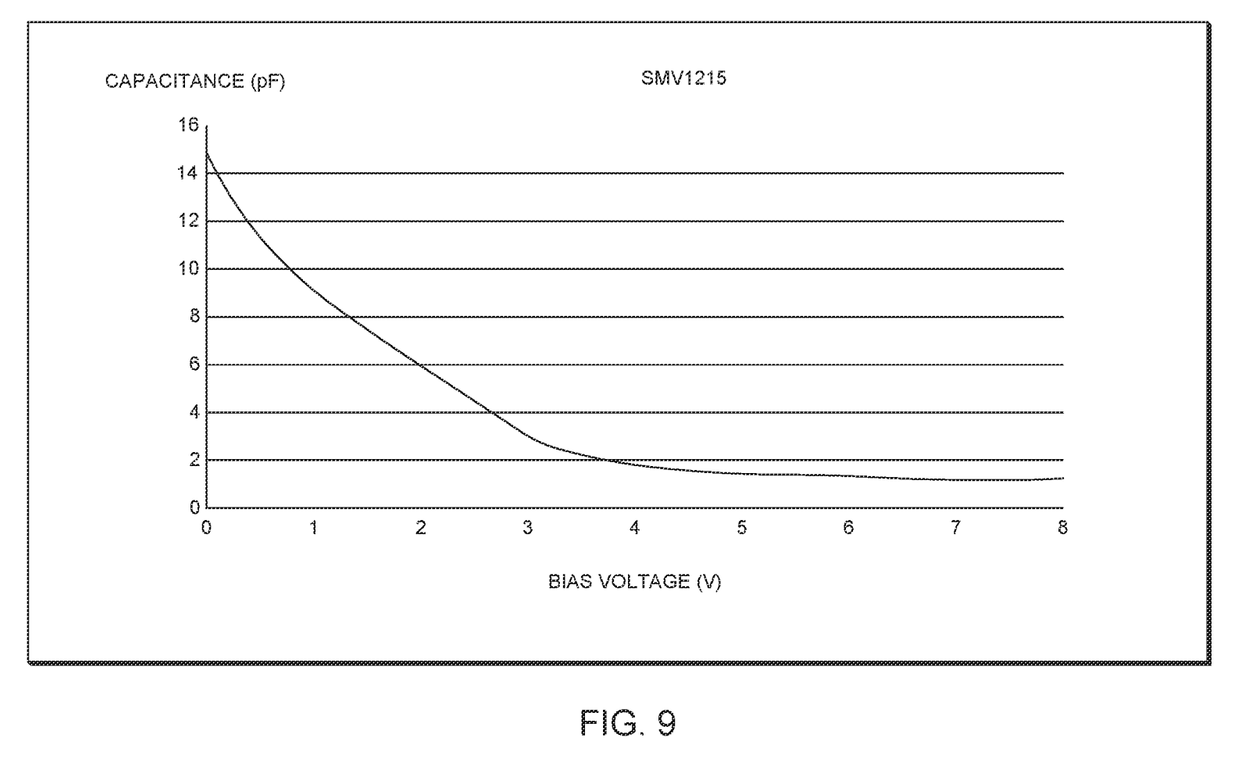
FIG. 9 shows a C-V curve of a varactor included in the dispersion compensation circuit of FIG. 8

In practical applications, the dispersion compensation circuits disclosed herein should preferably be tuned to compensate for dispersion of different fiber lengths. In some embodiments, this can be achieved by adjusting the bias voltage at each varactor diode. Referring to FIG. 8, for example, an exemplary adjustable dispersion compensation circuit 200 may comprise a circuit inductor "L" connected at one end to a time-varying input signal $V_{in}(t)$ and connected at the other end to a time-varying output signal $V_{out}(t)$. The time-varying output signal $V_{out}(t)$ is also connected to a cascading series of varactor circuit elements, each including a respective varactor (such as varactor $D_1$ 202, $D_2$ 206) along with a respective inductor (such as inductor $L_1$ 203, $L_2$ 207) that is connected to the cathode of its associated varactor 202, 206 etc. Each of the inductors $L_1$ 203, $L_2$ 207 provide respective voltage biases 204, 208 to their associated varactors. The varactors 202, 206 etc. in each of the cascaded varactor circuit elements are oriented with their respective cathodes toward the output terminal of the dispersion compensation circuit 200. In this exemplary circuit, the varactor 202 is an SMV1233 and the varactor 206 is an SMV1215. The C-V curve of SMV1215 is plotted in FIG. 9, which presents a larger AC/C to further help enhance the dispersion compensation capability.

To further enlarge the tuning range, the dispersion compensation circuit 200 preferably includes a switch 210, so that a first selective amount of dispersion compensation can be obtained through a single varactor 202, while a second selective amount of dispersion compensation may be obtained by a cascaded sequence of varactors 202 and 206. Those of ordinary skill in the art will appreciate that, although the illustrated circuit shows only two cascaded varactor circuit elements with one switch between them, alternative embodiments may include any desired number of cascaded varactor elements, with intervening switches as desired so as to further enhance the tunability of the disclosed dispersion compensation circuits. In a preferred embodiment, the switch 210 may be an RF switch that can be remotely activated and/or automatically controlled by a processing device.

To gauge the capability of the improved dispersion compensation circuit, the delay time delta, $\Delta T_{gd}$ is calculated for the single varactor circuit of bandwidth of 1.2 GHz, where the inductance and capacitance in the circuit of FIG. 2A are 4.7 nH and 3.9 pF. The varactor used is still assumed SMV1233 and the signal amplitude is assumed to be 0.6V. This calculated delay delta is then used to normalize the delay time delta calculated from the circuit in FIG. 8, which is designed for a circuit bandwidth of 1.8 GHz. Throughout the adjusting range of dispersion compensation of the proposed circuit in FIG. 8, the bandwidth and the impedance are maintained. Several calculated points are listed in Table 1, below. Since the capacitance of the proposed circuit is maintained roughly to 1.3 pF for the targeted filter bandwidth of 1.8 GHz and impedance of 50 ohm, the tuning of delay delta $\Delta T_{gd}$ of the circuit is determined by $$\frac{\Delta C}{C(v)}$$

as demonstrated by equation (6) where $T_{gd}$ is maintained constant due to the fixed inductance and capacitance.

TABLE 1

| $C_1$ (pF) | 3.67 | 3.03 | 2.05 | 1.7 | 1.5 | 1.41 | 1.3 | 1.2 |
|---|---|---|---|---|---|---|---|---|
| $C_2$ (pF) | 2.01 | 2.32 | 3.54 | 5.44 | 9.76 | 13.88 | | |
| $\Delta T_{gd1.8GHz}/\Delta T_{gd1.2GHz}$ | 1.21 | 1.15 | 1.04 | 0.89 | 0.67 | 0.65 | 0.44 | ~0 |

As shown in Table 1, the disclosed improved dispersion compensation circuits are able to achieve the same dispersion compensation as prior such circuits, even though the bandwidth of the improved dispersion compensation circuit is extended from, e.g. 1.2 GHz to 1.8 GHz. If, for example, the additional bandwidth capabilities of the disclosed circuits are not exploited, the enhanced capability of the improved dispersion compensation circuits disclosed herein instead may enable either a larger laser chirp or extended transmission link length. The disclosed, enhanced dispersion compensation circuits were experimentally tested, and proven to be effective.

It will be appreciated that the invention is not restricted to the particular embodiments that have been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. For example, the varactor bias at each varactor can be provided independently by using a DC blocking capacitor in series with each varactor and using inductors or ferrite beads on both sides of a varactor. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

The invention claimed is:

1. A dispersion compensation circuit for an optical transmitter, the circuit comprising:
    an input for receiving a time varying input signal and an output for transmitting a time varying output signal;
    a cascade of a plurality of varactor circuit elements connected at the output, each varactor circuit element having a respective varactor and at least one respective circuit device that provides a bias to the respective varactor circuit element different than the bias provided to other ones of the cascaded plurality of varactor circuit elements; and
    a switch configured to alternately connect and disconnect one or more varactor circuit element electrically from the cascade.

2. The dispersion compensation circuit of claim 1 where each of the plurality of varactor circuit elements is identical to other ones of the plurality of varactor circuit elements.

3. The dispersion compensation circuit of claim 2 where every varactor circuit element in the cascade is configured identically to all other varactor circuit elements in the cascade.

4. The dispersion compensation circuit of claim 1 where the bias of each varactor in the cascaded varactors is set based on a selected dispersion compensation level.

5. The dispersion compensation circuit of claim 1 where the electronic dispersion compensation circuit drives a laser in a transmitter.

6. The dispersion compensation circuit of claim 1 where the at least one respective circuit device includes an inductor.

7. The dispersion compensation circuit of claim 1 where the at least one respective circuit device includes a capacitor.

8. A method of tuning a dispersion compensation circuit having a cascade of a plurality of varactor circuit elements connected at an output to the dispersion compensation circuit, each varactor circuit element having a respective varactor and at least one respective circuit device that provides a bias to the respective varactor circuit element different than the bias provided to other ones of the cascaded plurality of varactor circuit elements, the method comprising:
    activating a switch that alternately connects and disconnects one or more varactor circuit element electrically from the cascade.

9. The method of claim 8 where the bias of each varactor in the cascaded varactors is determined based on a desired dispersion compensation level.

10. The method of claim 8 where the total capacitance of the cascaded varactors is determined by a desired bandwidth of the dispersion compensation circuit.

11. The method of claim 8 where the total capacitance of the cascaded varactors is determined by the characteristic impedance of the dispersion compensation circuit.

12. A dispersion compensation circuit for an optical transmitter that emits light onto an optical propagation medium, the circuit comprising:
    an input for receiving a time varying input signal and an output for transmitting a time varying output signal modified by the dispersion compensation circuit relative to the input signal to provide an amount of dispersion compensation that mitigates dispersion caused by the optical propagation medium; and
    a switch capable of selectively changing the amount of dispersion compensation provided by the circuit.

13. The dispersion compensation circuit of claim 12 including a cascade of a plurality of varactor circuit elements connected at the output, each varactor circuit element having a respective varactor and at least one respective circuit device that provides a bias to the respective varactor circuit element different than the bias provided to other ones of the cascaded plurality of varactor circuit elements.

14. The dispersion compensation circuit of claim 13 where each of the plurality of varactor circuit elements is identical to other ones of the plurality of varactor circuit elements.

15. The dispersion compensation circuit of claim 14 where every varactor circuit element in the cascade is configured identically to all other varactor circuit elements in the cascade.

16. The dispersion compensation circuit of claim 13 where the bias of each varactor in the cascaded varactors is set based on a selected dispersion compensation level.

17. The dispersion compensation circuit of claim 13 where the electronic dispersion compensation circuit drives a laser in in a transmitter.

18. The dispersion compensation circuit of claim 13 where the at least one respective circuit device includes an inductor.

19. The dispersion compensation circuit of claim 13 where the at least one respective circuit device includes a capacitor.

20. The dispersion compensation circuit of claim 13 where the switch is an RF switch.

\* \* \* \* \*